United States Patent
Naegler et al.

(10) Patent No.: US 7,633,409 B2
(45) Date of Patent: Dec. 15, 2009

(54) AIRCRAFT PROVIDED WITH A CABIN DIFFERENTIAL PRESSURE WARNING SYSTEM

(75) Inventors: Dietmar Naegler, Donauwoerth (DE); Holger Schreitmueller, Harburg (DE)

(73) Assignee: Eurocopter Deutschland GmbH, Donauworth (DE)

( * ) Notice: Subject to any disclaimer, the term of this patent is extended or adjusted under 35 U.S.C. 154(b) by 299 days.

(21) Appl. No.: 11/576,373

(22) PCT Filed: Sep. 29, 2005

(86) PCT No.: PCT/EP2005/010509

§ 371 (c)(1),
(2), (4) Date: Mar. 30, 2007

(87) PCT Pub. No.: WO2006/037543

PCT Pub. Date: Apr. 13, 2006

(65) Prior Publication Data

US 2008/0048889 A1    Feb. 28, 2008

(30) Foreign Application Priority Data

Sep. 30, 2004  (DE) .................. 10 2004 048 217

(51) Int. Cl.
*G08B 21/00*    (2006.01)

(52) U.S. Cl. .................................... 340/945

(58) Field of Classification Search ................ 340/945, 340/970, 977; 701/4, 9; 244/90 B
See application file for complete search history.

(56) References Cited

U.S. PATENT DOCUMENTS

| | | | |
|---|---|---|---|
| 5,251,851 A * | 10/1993 | Herrmann et al. | 244/129.5 |
| 5,394,142 A | 2/1995 | Dusart et al. | |
| 5,577,781 A | 11/1996 | Kallies et al. | |
| 6,452,510 B1 * | 9/2002 | Zysko | 340/970 |
| 6,737,988 B2 * | 5/2004 | Horner et al. | 340/970 |
| 7,066,808 B2 * | 6/2006 | Whitney et al. | 454/70 |
| 2002/0173263 A1 | 11/2002 | Petri et al. | |
| 2003/0173408 A1 * | 9/2003 | Mosher et al. | 235/492 |

FOREIGN PATENT DOCUMENTS

| | | |
|---|---|---|
| DE | 196 26 333 | 1/1998 |
| DE | 100 55 401 | 1/2002 |
| DE | 103 01 188 | 8/2003 |
| DE | 102 40 511 | 3/2004 |
| EP | 0 947 423 | 10/1999 |
| EP | 1310424 | 5/2003 |
| GB | 601 058 | 4/1948 |
| WO | WO-2004/022425 | 3/2004 |

\* cited by examiner

*Primary Examiner*—Phung Nguyen
(74) *Attorney, Agent, or Firm*—Darby & Darby

(57) ABSTRACT

An aircraft includes a pressurised cabin with a lockable door, an electrical energy supply network, and a cabin differential pressure warning system provided with an autonomous waning system energy supply device, which is independent of the electrical energy supply network.

12 Claims, 3 Drawing Sheets

AIRCRAFT PROVIDED WITH A CABIN DIFFERENTIAL PRESSURE WARNING SYSTEM

FIELD OF THE INVENTION

The present invention relates to an aircraft with a cabin differential pressure warning system.

BACKGROUND

Aircraft that operate at high flying altitudes are normally equipped with a pressurized cabin that is accessible through a lockable door. During flight, the pressurized cabin ensures an essentially constant internal pressure in the cabin that is largely independent of the specific flying altitude and of the prevailing atmospheric ambient pressure and that is tolerable for the aircraft occupants, said internal pressure in the cabin corresponding approximately to an atmospheric air pressure at an altitude of about 8,000 feet to 10,000 feet at the maximum. Since the atmospheric ambient pressure drops as the flying altitude increases, elevated pressure ("overpressure") vis-à-vis the atmospheric ambient pressure prevails in the pressurized cabin at flying altitudes of more than 10,000 feet. The internal pressure in the cabin is normally regulated by means of an internal-pressure regulating device as well as by the so-called flight management system of the aircraft. When the aircraft has once again parked on the ground following a flight, the internal pressure in the cabin should once again match the atmospheric ambient pressure to ensure that the door can be safely opened. In other words, no pressure differential should exist between the interior of the cabin and the outside environment. This pressure differential will be referred to below as the cabin differential pressure.

Since an internal cabin pressure that is lower than the atmospheric ambient pressure (that is to say, "underpressure") is very dangerous for the structure of the aircraft, aircraft equipped with pressurized cabins usually have special protection mechanisms with one-way valves that prevent the build-up of a negative differential pressure ("underpressure"). In spite of this, after a flight, it can nevertheless happen in some cases that a certain cabin differential pressure is present. As a rule, this is an "overpressure" (although slight "underpressures" are also possible). If the door is unlocked and opened in this state, it flies open in an uncontrolled, quick manner, creating a strong air current that exerts a corresponding suction effect. This poses a considerable hazard to persons who are operating the door or who are in its immediate vicinity. Moreover, this can cause structural damage to the aircraft.

For this reason, aircraft that have a pressurized cabin are equipped with a cabin differential pressure warning system that, for example, detects the presence of any cabin differential pressure when the door is about to be opened and emits a warning signal. The aircraft crew can then first vent the pressurized cabin prior to opening the door, equalizing the pressure between the cabin and the outside environment, so that the door can then be opened without risk.

Conventional cabin differential pressure warning systems that indicate the presence of a cabin differential pressure, for instance, by means of a warning light, are connected to the electric energy supply network of the aircraft, which provides it with electric energy. If this electric energy supply network fails, the cabin differential pressure warning system no longer functions. Consequently, the personnel operating the door can no longer be warned about the cabin differential pressure, and the above-mentioned risks remain. A comparable hazard potential exists during maintenance work if the electric energy supply of the aircraft is not available and the cabin is under pressure.

SUMMARY OF THE INVENTION

An object of the present invention is to largely one or more disadvantages associated with the generic state of the art and to provide an aircraft having a pressurized cabin and an improved, more reliable and/or safer cabin differential pressure warning system.

This aircraft comprises a pressurized cabin with a lockable door, an electric energy supply network as well as a cabin differential pressure warning system having an autonomous warning-system energy supply device that is independent of the electric energy supply network.

Since, in the case of the solution according to the invention, the energy supply device of the cabin differential pressure warning system is configured so as to be a separate, autonomous system that is completely independent of the electric energy supply network of the aircraft, it can function reliably even if the electric energy supply network of the aircraft malfunctions or even if it fails altogether or is out of operation. Moreover, the cabin differential pressure warning system works virtually free of wear and tear. In view of the above-mentioned advantages, the safety can be markedly improved when the door of a pressurized cabin is opened. Moreover, the electric energy supply network of the aircraft during its normal operation (no failure or defect) is not burdened by the cabin differential-pressure warning system. It is also possible to configure the cabin differential pressure warning system, including its independent, autonomous electric energy supply device, as a separate, independent, autonomous and modular single unit and, for example, to integrate it completely into the door. Interfaces to said electric energy supply network of the aircraft or to the on-board electrical system of the aircraft are either no longer necessary or else only to a limited extent. Last but not least, conventional aircraft can easily be refurbished to accommodate the system according to the invention, a process in which many of the components and units already in place can be utilized.

The positive properties elaborated upon above make it possible to reduce the complexity and potential susceptibility to malfunction on the part of the entire system, thus providing a modular, easy-to-install and cost-effective device that is simpler to design and manufacture and that is simple to maintain or replace whenever necessary, which increases the safety and cost-effectiveness of the aircraft.

Additional preferred and advantageous embodiment features of the aircraft according to the invention are the subject matter of the subordinate claims.

A preferred embodiment of the invention with additional configuration details and further advantages will be described in greater detail and explained below, making reference to the accompanying drawings.

BRIEF DESCRIPTION OF THE DRAWINGS

The following is shown.

DETAILED DESCRIPTION OF A PREFERRED EMBODIMENT

Figure 1:
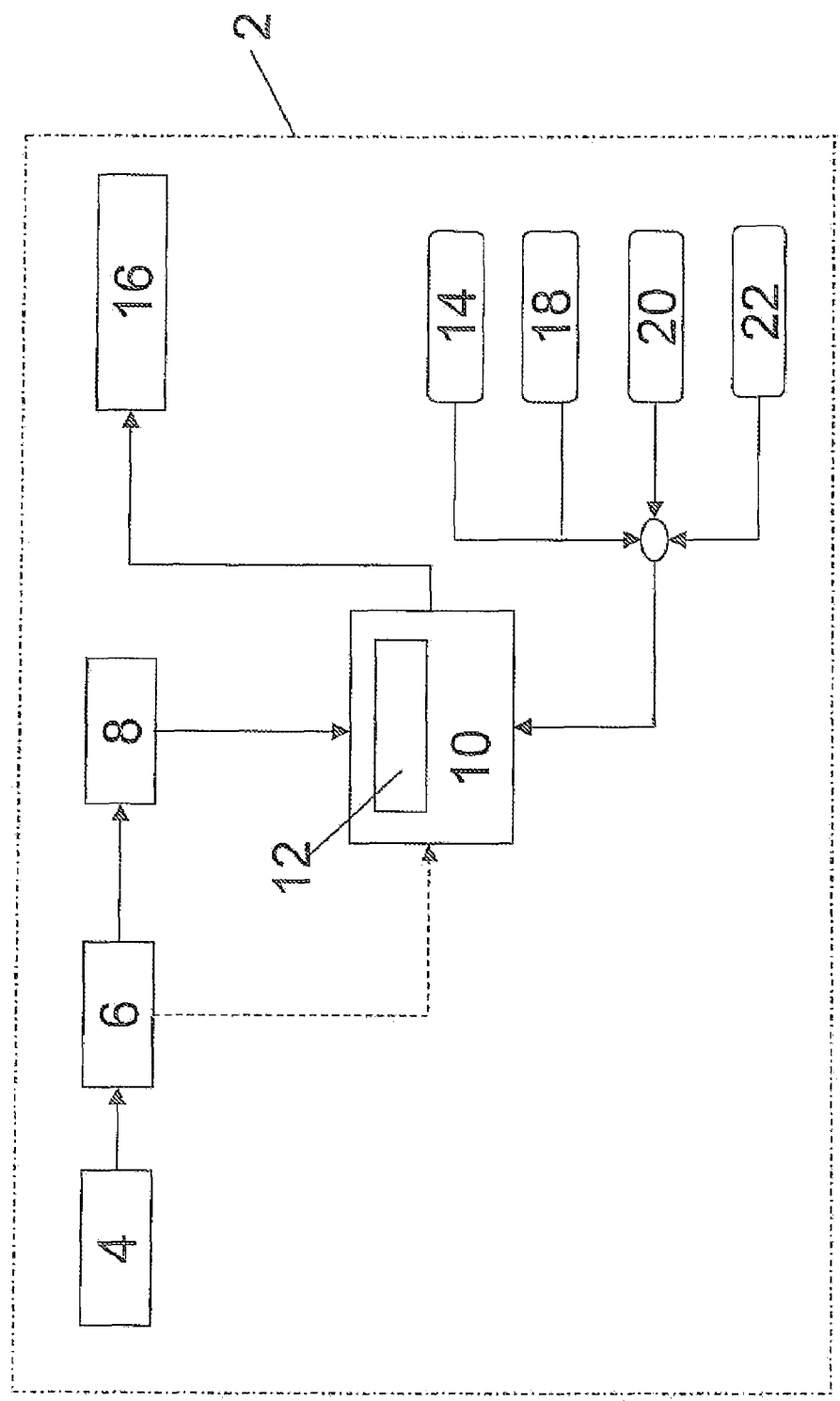
FIG. 1—a schematic block diagram of a cabin differential pressure warning system of an aircraft according to the invention.

An aircraft according to the invention comprises a pressurized cabin having a lockable door and a door locking device. The door has a handle or another suitable element with which the door locking device for locking and unlocking can be actuated and with which the door can be moved either manually or with the assistance of an automatic door mechanism in order to be opened or closed. In this embodiment, the door is configured with an emergency slide. In case of an emergency, it should be possible to deploy the emergency slide rapidly. In order to allow this, the emergency slide first has to be armed by means of an operating element. Then, when the door is subsequently opened, the emergency slide is immediately activated and deployed automatically by means of a triggering mechanism. In contrast, during normal operation (no emergency), for instance, when the passengers are going to leave the pressurized cabin via the door once the aircraft has parked, the emergency slide must not be armed and must not be deployed. The aircraft is also equipped with a generally known electric energy supply network. For the sake of clarity, the aircraft with its above-mentioned components is not depicted in the attached drawings.

Furthermore, the aircraft according to the invention has a cabin differential pressure warning system (hereinafter referred to as KDWS) 2, which is shown in a schematic block diagram in FIG. 1. The KDWS 2 is completely or almost completely integrated into the door and has an autonomous warning system energy supply device that is independent of the electric energy supply network of the aircraft. In the present embodiment, this device comprises an electric energy generator, namely, a photovoltaic energy generator in the form of one or more solar cells 4.

In this example, the solar cells 4 are arranged on the outside of the door of the aircraft and, for aerodynamic reasons, are preferably flush with the outside. However, they can also be installed inside the door (for example, in a so-called window well) and covered by a light-permeable element that allows light to reach the solar cells 4. By the same token, installation in the interior of the pressurized cabin is likewise conceivable. As can also be seen in FIG. 1, the solar cells 4 are connected via a charge regulator 6 to an accumulator 8 that functions as an electric energy intermediate storage device. The accumulator 8 has sufficient capacity that is adapted to the energy demand of the KDWS 2 so that enough reserves exist to reliably bridge even dark phases.

Another component comprised by the KDWS 2 is a central differential pressure control device 10 (hereinafter referred to as control device) that is connected to the accumulator 8. As is indicated in FIG. 1 by a broken line, if there is no accumulator 8, then the control device 10 could also be connected directly to the charge regulator 6. By the same token, it is also possible to bridge the accumulator 8 in a suitable manner (see below) and to obtain the energy for the control device 10 directly via the charge regulator 6 if the accumulator were to fail due to a defect or because the state of charge was too low. The control device 10 can have a data processing unit 12 or can be functionally coupled to such a unit. The data processing unit 12 can be freely programmed and/or, if necessary, can have permanently pre-programmed components (for example, in the form of permanent or replaceable control modules). The data processing unit 12 preferably has an interface with which it can be connected to an external data processing unit (not shown here) so that data can be read out of or into the data processing unit 12, with the result that, in this manner, the control device 10 can be optionally adapted to different operating conditions, control routines, aircraft types and add-on devices.

The KDWS 2 also has a cabin differential pressure sensor unit that is coupled to the control device 10. This sensor unit has a cabin differential pressure sensor 14 or differential pressure switch (hereinafter referred to as differential pressure sensor 14) that detects a cabin differential pressure $\Delta P$ and, once a predefined differential pressure threshold value $\Delta P_S$ is reached, supplies a signal or switching signal to the control device 10. The differential pressure sensor 14 or differential pressure switch is preferably adjustable, so that various differential pressure threshold values $\Delta P_S$ can be pre-specified as needed. For instance, a value of ±2.5 millibar is pre-set as the differential pressure threshold value $\Delta P_S$.

The control device 10 is connected to a warning-signal emitting device 16 which, in this embodiment, has an acoustic as well as an optical warning-signal emitter. Examples of acoustic warning-signal emitters of the warning-signal emitting device 16 are loudspeakers, sirens, buzzers, beepers, whistles, etc. or a speech generator coupled to a loudspeaker for purposes of issuing a warning. If a speech generator is employed, it is preferably programmable and adjustable so that it can make announcements in different languages, as needed. Examples of optical warning-signal emitters of the warning-signal emitting device 16 are warning lights or displays with a suitable indicator or the like. Combinations of the various warning-signal emitters are also possible.

In addition to the above-mentioned differential pressure sensor 14, the control device 10 is coupled to a sensor unit 18 that detects the state of the door (hereinafter referred to as door sensor 18). The door sensor 18 recognizes, for example, an actuation state of the handle of the door (for instance, handle pulled or not pulled) and emits a corresponding signal to the control device 10. In addition to the door sensor 18, there is a sensor unit 20 connected to the control device 10 for purposes of detecting a state of the emergency slide (hereinafter referred to as emergency slide sensor 20). The emergency slide sensor 20 detects, for example, whether the emergency slide was armed or not and issues a corresponding signal to the control device 10.

And finally, the control device 10 is also connected to a sensor unit 22 for detecting a state of the energy intermediate storage device, that is to say, the accumulator 8 in the case here. This sensor unit 22 will be referred to below as accu-sensor 22. In particular, this sensor detects the state of charge of the accumulator 8 and supplies a signal to the control device 10 when a predefined threshold value (which represents a low state of charge, for example) is reached. The accu-sensor 22 can also be configured as an accu-sensor switch in order to switch the above-mentioned bridge to the charge regulator 6 (see FIG. 1, broken line) if the state of charge of the accumulator 8 is too low or if the accumulator 8 fails due to a system malfunction or defect.

Even though in this embodiment all of the above-mentioned sensors 14, 18, 20, 22 are connected to the control device 10, it is fundamentally possible to provide the door sensor 18 and/or the emergency slide sensor 20 and/or the accu-sensor 22 with separate subsystems and/or switching circuits and/or with a separate warning-signal emitter. This, however, entails greater manufacturing effort so that preference is given to the previously described variant. Furthermore, the control device 10 can be connected via another interface (not shown here) to a display instrument in the cockpit and/or in the cabin of the aircraft in order to, for example, provide information to the pilot and/or crew members about the cabin differential pressure and the state of the door, of the accumulator 8, of the charge regulator 6 or of the solar cells 4.

Making reference to FIG. 2, which depicts a first flowchart of the KDWS 2 shown in FIG. 1, the function of the KDWS 2 will be explained on the basis of a differential pressure warning routine that runs in the control device 10 when the aircraft is parked on the ground and the door of the pressurized cabin is going to be opened.

Beginning with a start function (START), in a first step S1, the differential pressure sensor 14 detects the differential pressure $\Delta P$ and compares it to the predefined differential pressure threshold value $\Delta P_S$. If the detected differential pressure $\Delta P$ is greater than the differential pressure threshold value $\Delta P_S$, the routine proceeds to step S2, in which the emergency-slide sensor 20 checks whether the emergency slide has been armed. If so, the differential pressure warning routine is aborted and, within the scope of a subroutine not shown in FIG. 2, the personnel operating the door is alerted to the fact that the door is still armed and that this state first has to be deactivated. If, in contrast, the emergency slide is not armed, the routine continues to step S3.

In step S3, the door sensor 18 checks whether the handle of the door is actuated or not. If not, the routine is aborted again. If, in contrast, the door handle is actuated, the control device 10 activates the warning signal emitting device 16 and emits a warning signal as step S4. The personnel operating the door now knows that an impermissible cabin differential pressure is present and that the pressurized cabin first has to be vented in order to equalize the pressure between the cabin and the outside environment before the door can be opened.

In the differential pressure warning routine described above, the individual routine steps take place in a chain of consecutive test conditions in the form of a cascade. As a result, the KDWS 2 is capable of self-testing.

Figure 2:
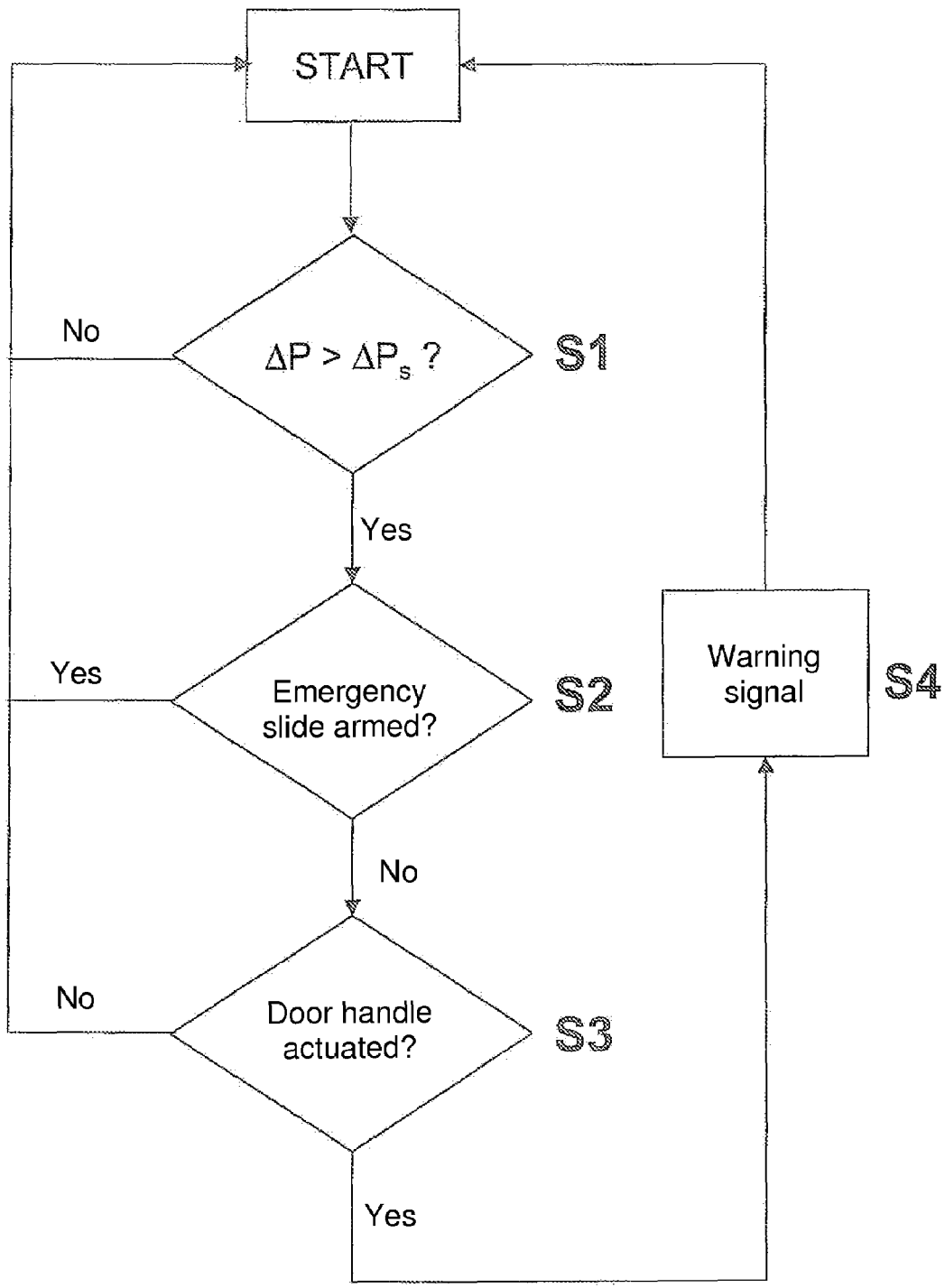
FIG. 2—a first flowchart of the cabin differential pressure warning system shown in FIG. 1.
Figure 3:
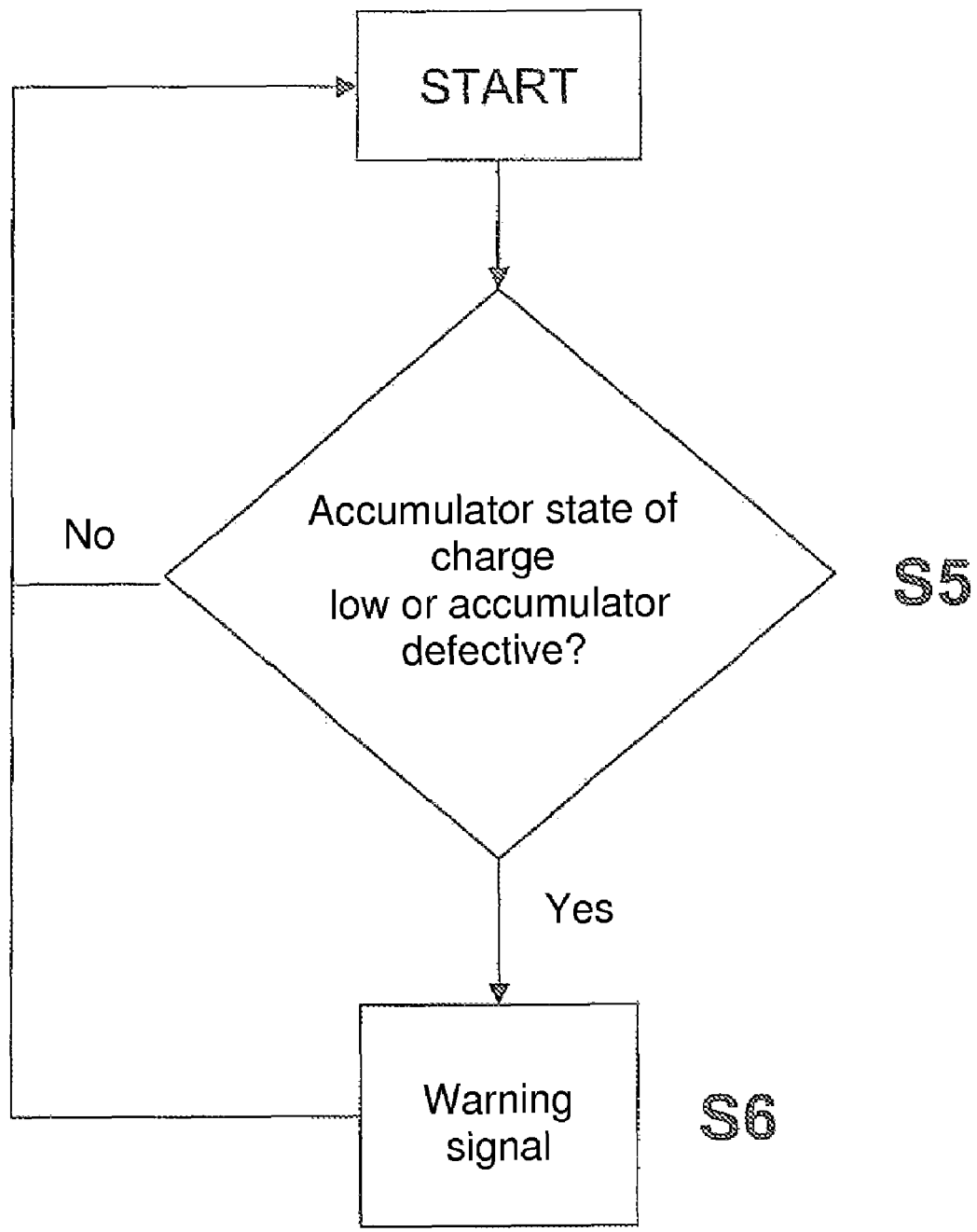
FIG. 3—a second flowchart of the cabin differential pressure warning system shown in FIG. 1.

FIG. 3 depicts a second flowchart of the KDWS 2 shown in FIG. 1, with a routine that monitors the state or the state of charge of the accumulator 8. Beginning with a start function (START), in a step S5, the accu-sensor 22 checks the state or the state of charge of the accumulator 8. If the accu-sensor 22 detects a malfunction of the accumulator 8 or an excessively low state of charge, a warning signal is emitted as step S6. In addition, if necessary, the accu-sensor 22 (if it is configured as an accu-sensor switch) can bridge the connection of the control device 10 to the accumulator 8 and can switch the control device 10 through to the charge regulator 6 of the solar cells 4, so that the control device 10 is supplied directly with electric current via the charge regulator 6. The latter switching variant is not shown in FIG. 3. Fundamentally speaking, a routine that is comparable to this accumulator-monitoring routine could also be provided to test the operating state of the solar cells 4.

In the present example, the accumulator-monitoring routine described above is carried out in the control device 10, whereby the warning signal is also generated by the warning-signal emitting device 16 in step S6. Fundamentally, the accumulator-monitoring routine can, of course, also be executed separately from the monitoring of the cabin differential pressure, in a separate device, whereby a separate warning-signal emitter can also be used for step S6. On the other hand, the accumulator-monitoring routine can also be integrated into the routine of FIG. 2 and its cascade-like structure.

The invention is not limited to the embodiment presented above. Rather, within the framework of the protective scope, the aircraft according to the invention can also have a configuration that differs from the one specifically described above.

Thus, instead of an electric energy generator in the form of solar cells, for instance, it is also possible to use other electric energy generating devices such as, for example, generators, or else chemical, electrochemical, electromagnetic, electrothermal, electrostrictive, mechanical, pneumatic or hydraulic energy generating devices as well as mixed forms thereof. The energy generator employed in each case should be appropriately harmonized in a suitable manner with the other components of the KDWS. By the same token, other types of energy intermediate storage devices adapted as a function of the energy generator are also feasible such as, for instance, chemical, electrochemical, electromagnetic, electrothermal, electrostrictive, mechanical, pneumatic or hydraulic intermediate storage devices as well as combinations thereof.

In the embodiment above, optionally and additionally to the solar cells 4 and the charge regulator 6, the accumulator 8 can be associated with an interface to an external charging device that can be connected to the aircraft. Likewise conceivable is an interface to a charging device situated inside the aircraft, said charging device being supplied with electric energy via the regular electric energy supply network of the aircraft.

In order to provide an independent, autonomous warning-system energy supply device, unlike the embodiment above, it is also possible to dispense with the solar cells 4 and the charge regulator 6 and, for instance, to employ only the accumulator 8 or a battery as the source of energy for the KDWS 2. The state of charge of these energy sources, however, has to monitored very painstakingly so that when the state of charge of the accumulator is low, it can be charged by means of a connectable external charging device or else the battery can be replaced with a new one.

Fundamentally, the cabin differential pressure warning system of the aircraft according to the invention could also be employed in other types of vehicles or devices that have a pressurized cabin that can be closed with a door such as, for instance, submarines, spacecraft, pressure chambers, air locks and the like.

The reference numerals in the claims, in the description and in the drawings serve merely to better elucidate the invention and should not be construed as a limitation of the protective scope.

The invention claimed is:

1. An aircraft comprising:
   a pressurized cabin;
   a lockable door;
   an electric energy supply network;
   a cabin differential pressure warning system having an autonomous warning-system energy supply device independent of the electric energy supply network, wherein the cabin differential pressure warning system includes a differential pressure control device coupled to the autonomous warning system energy supply device, a cabin differential pressure sensor unit, a warning-signal emitting device, and a door sensor unit coupled to the differential pressure control device that detects a state of the door.

2. The aircraft as recited in claim 1, wherein the autonomous warning-system energy supply device includes an energy generating device.

3. The aircraft as recited in claim 2, wherein the energy generating device is an electric energy generating device.

4. The aircraft as recited in claim 2, wherein the energy generating device is disposed on the door.

5. The aircraft as recited in claim 4, wherein the energy generating device is disposed on an outside of the door.

6. The aircraft as recited in claim 2, wherein the autonomous warning-system energy supply device includes an energy intermediate storage device coupled to the energy generating device.

7. The aircraft as recited in claim 6, wherein the energy intermediate storage device is an electric energy intermediate storage device.

8. The aircraft as recited in claim 6, further comprising an emergency slide associated with the door, and wherein the cabin differential pressure warning system has a storage device sensor unit coupled to a differential pressure control device that detects a state of the energy intermediate storage device.

9. The aircraft as recited in claim 1, wherein the warning-signal emitting device includes at least one of an optical warning-signal emitter and an acoustic warning-signal emitter.

10. The aircraft as recited in claim 1, further comprising an emergency slide associated with the door, and wherein in that the cabin differential pressure warning system includes a slide sensor unit coupled to the differential pressure control device for detecting a state of the emergency slide.

11. The aircraft as recited in claim 1, wherein the differential pressure control device includes a data processing unit.

12. The aircraft as recited in claim 1, wherein the cabin differential pressure warning system is integrated into the door.

* * * * *